United States Patent
Otsuka

(10) Patent No.: US 12,266,991 B2
(45) Date of Patent: Apr. 1, 2025

(54) DUAL STATORS WITH INTERLEAVED TEETH FOR A RADIAL ELECTRIC MACHINE

(71) Applicant: MINEBEA MITSUMI Inc., Nagano (JP)

(72) Inventor: Makoto Otsuka, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 260 days.

(21) Appl. No.: 17/905,359

(22) PCT Filed: Mar. 5, 2021

(86) PCT No.: PCT/JP2021/008729
§ 371 (c)(1),
(2) Date: Aug. 31, 2022

(87) PCT Pub. No.: WO2021/177451
PCT Pub. Date: Sep. 10, 2021

(65) Prior Publication Data
US 2023/0121957 A1    Apr. 20, 2023

(30) Foreign Application Priority Data
Mar. 5, 2020 (JP) ................................ 2020-038166

(51) Int. Cl.
*H02K 3/28* (2006.01)
*H02K 1/18* (2006.01)

(52) U.S. Cl.
CPC ................. *H02K 3/28* (2013.01); *H02K 1/18* (2013.01)

(58) Field of Classification Search
CPC .................................. H02K 3/28; H02K 16/04
See application file for complete search history.

(56) References Cited

U.S. PATENT DOCUMENTS

2004/0164639 A1*  8/2004  Yamamoto ............. H02K 1/148
                                                  310/216.012
2005/0140241 A1*  6/2005  Petersen ................. H02K 21/16
                                                  310/44
(Continued)

FOREIGN PATENT DOCUMENTS

JP    2006-197674 A    7/2006
JP    2009-195006 A    8/2009
(Continued)

OTHER PUBLICATIONS

JP 2019037103 A—Machine Translation (Year: 2019).*
(Continued)

*Primary Examiner* — Tran N Nguyen
*Assistant Examiner* — Masoud Vaziri
(74) *Attorney, Agent, or Firm* — Chrisman Gallo Tochtrop LLC

(57) ABSTRACT

Provided is an easily assembled motor. In series coils in a first coil group and a third coil group, a direction of forming a plurality of coils is a first direction (A), and in a series coil in a second coil group, a direction of forming a plurality of coils is a second direction (B). Winding end parts of series coils in the first coil group and winding start parts of series coils in the second coil group are connected, winding end parts of series coils in the third coil group and winding start parts of the series coils in the first coil group are connected, and winding end parts of the series coils in the second coil group and winding end parts of the series coils in the third coil group are connected.

20 Claims, 11 Drawing Sheets

(56) References Cited

U.S. PATENT DOCUMENTS

| | | | | |
|---|---|---|---|---|
| 2009/0267441 | A1* | 10/2009 | Hiramatsu | H02K 15/066 |
| | | | | 310/215 |
| 2011/0068647 | A1* | 3/2011 | Sakaue | H02K 3/28 |
| | | | | 310/71 |
| 2012/0280678 | A1 | 11/2012 | Yura et al. | |
| 2014/0042851 | A1* | 2/2014 | Takemoto | H02K 1/243 |
| | | | | 29/598 |
| 2019/0363663 | A1* | 11/2019 | Hirotani | H02K 1/16 |
| 2020/0014257 | A1* | 1/2020 | Lee | H02K 16/02 |

FOREIGN PATENT DOCUMENTS

| | | | |
|---|---|---|---|
| JP | 2012-233806 A | | 11/2012 |
| JP | 2019037103 A | * | 3/2019 |
| JP | 2020-503825 A | | 1/2020 |
| WO | 2009/139067 A1 | | 11/2009 |
| WO | 2016/194182 A1 | | 12/2016 |
| WO | 2019/009478 A1 | | 1/2019 |

OTHER PUBLICATIONS

JP-2019037103-A Machine Translation (Year: 2009).*
International Search Report for corresponding International Application No. PCT/JP2021/008729 mailed May 11, 2021.
Written Opinion for corresponding International Application No. PCT/JP2021/008729 dated May 11, 2021 and English translation.

* cited by examiner

DUAL STATORS WITH INTERLEAVED TEETH FOR A RADIAL ELECTRIC MACHINE

CROSS-REFERENCE TO RELATED APPLICATIONS

This application is a national stage entry of International Application No. PCT/JP2021/008729 filed on Mar. 5, 2021, which claims the benefit of priority to Japanese Application No. JP2020-038166, filed Mar. 5, 2020, the entire disclosures of which are hereby incorporated herein by reference.

TECHNICAL FIELD

The present invention relates to a motor.

BACKGROUND ART

To achieve high output and miniaturization of a motor, increasing the number of teeth of a stator core and improving a winding density (space factor) is sometimes awaited. Unfortunately, increasing the number of teeth without changing the size of the stator core itself reduces a distance between distal ends of the teeth in particular, resulting in difficulty in winding work.

A solution proposal for the above includes a configuration with the stator core divided into two parts. That is, the division reduces the number of teeth per stator core, and a distance between the teeth is easily kept, and thus workability of winding is less likely to decrease even by increasing the total number of teeth.

In a brushless motor, rotation may be controlled by setting a coil of, for example, three-phase (U-phase, V-phase, and W-phase) and supplying power to the coil of each phase at an appropriate timing. Such a three-phase coil forms a Δ connection or a Y connection by using a winding start part and a winding end part appropriately connected, but the winding start part and the winding end part are disposed apart from each other, and a connecting wire may increase in length. When the connecting wire between coils increases in length, for example, wire connection work become difficult, or interference between connecting wires and interference between the connecting wire and an opposing stator core occurs, and thus assembling a motor may be made difficult.

CITATION LIST

Patent Literature

PTL 1: WO 2016/194182

SUMMARY OF INVENTION

Technical Problem

Therefore, an object of the present invention is to provide a motor configured to be easily assembled.

Solution to Problem

A motor according to the present invention includes a rotor, a first stator and a second stator overlapping in a direction of a rotation axis of the rotor, a first coil group forming a first phase, a second coil group forming a second phase, and a third coil group forming a third phase. The first stator and the second stator each include a coil constituting the first coil group, a coil constituting the second coil group, and a coil constituting the third coil group provided aligning in this order in a circumferential direction around the rotation axis. The first coil group, the second coil group, and the third coil group each include a plurality of coils provided at the first stator connected in series and a plurality of coils provided at the second stator connected in series. In the plurality of coils connected in series in the first coil group and the third coil group, a direction of forming the plurality of coils is a first direction of the circumferential direction, and in the plurality of coils connected in series in the second coil group, a direction of forming the plurality of coils is a second direction opposite to the first direction. Winding end parts of the plurality of coils connected in series in the first coil group and winding start parts of the plurality of coils connected in series in the second coil group are connected, winding end parts of the plurality of coils connected in series in the third coil group and winding start parts of the plurality of coils connected in series in the first coil group are connected, and winding end parts of the plurality of coils connected in series in the second coil group and winding start parts of the plurality of coils connected in series in the third coil group are connected.

In the present invention, in each of the first coil group, the second coil group, and the third coil group, preferably, the plurality of coils provided at the first stator and connected in series and the plurality of coils plurality of coils provided at the second stator and connected in series are electrically connected in parallel.

In the present invention, preferably, at least two connected to each other of the winding start parts and the winding end parts in the first coil group, the second coil group, and the third coil group include a lead wire drawn in a radial direction and connected to each other, and a plurality of the lead wires is disposed aligning in the circumferential direction.

In the present invention, with the first stator and the second stator overlapped in the direction of the rotation axis, preferably, the coil provided at the first stator and constituting the first coil group and the coil provided at the second stator and constituting the first coil group are adjacent to each other in the circumferential direction, the coil provided at the first stator and constituting the second coil group and the coil provided at the second stator and constituting the second coil group are adjacent to each other in the circumferential direction, and the coil provided at the first stator and constituting the third coil group and the coil provided at the second stator and constituting the third coil group are adjacent to each other in the circumferential direction.

In the present invention, preferably, the first stator and the second stator each include an annular part, a plurality of magnetic pole parts extending from the annular part to one side in the radial direction, and a plurality of protruding parts extending from the annular part to the one side, the plurality of protruding parts is disposed between two of the magnetic pole parts in each of the first stator and the second stator, and end parts of the protruding parts at the one side of the first stator and end parts of the magnetic pole parts at the other side in the radial direction of the second stator oppose each other in the radial direction.

In the present invention, the first stator and the second stator each include an annular part and a plurality of magnetic pole parts extending from the annular part to one side in the radial direction, and parts of the annular part between two of the magnetic pole parts of the first stator and end parts of the magnetic pole parts at the other side in the radial direction of the second stator may oppose each other in the radial direction.

In the present invention, preferably, a stepped part is formed at the end parts of the magnetic pole parts at the other side.

In the present invention, the first stator and the second stator each include an annular part and a plurality of magnetic pole parts extending from the annular part to one side in the radial direction, and end parts of the magnetic pole parts at the other side in the radial direction of the second stator may be fitted into parts of the annular part between two of the magnetic pole parts of the first stator.

In the present invention, preferably, a recessed part is formed between the two magnetic pole parts at the one side of the annular part, and end parts of the magnetic pole parts at the other side of the second stator are fitted into a plurality of the recessed parts of the first stator.

In the present invention, preferably, the end parts of the magnetic pole parts at the other side includes a convex curve portion toward the other side.

DESCRIPTION OF EMBODIMENTS

Figure 1:
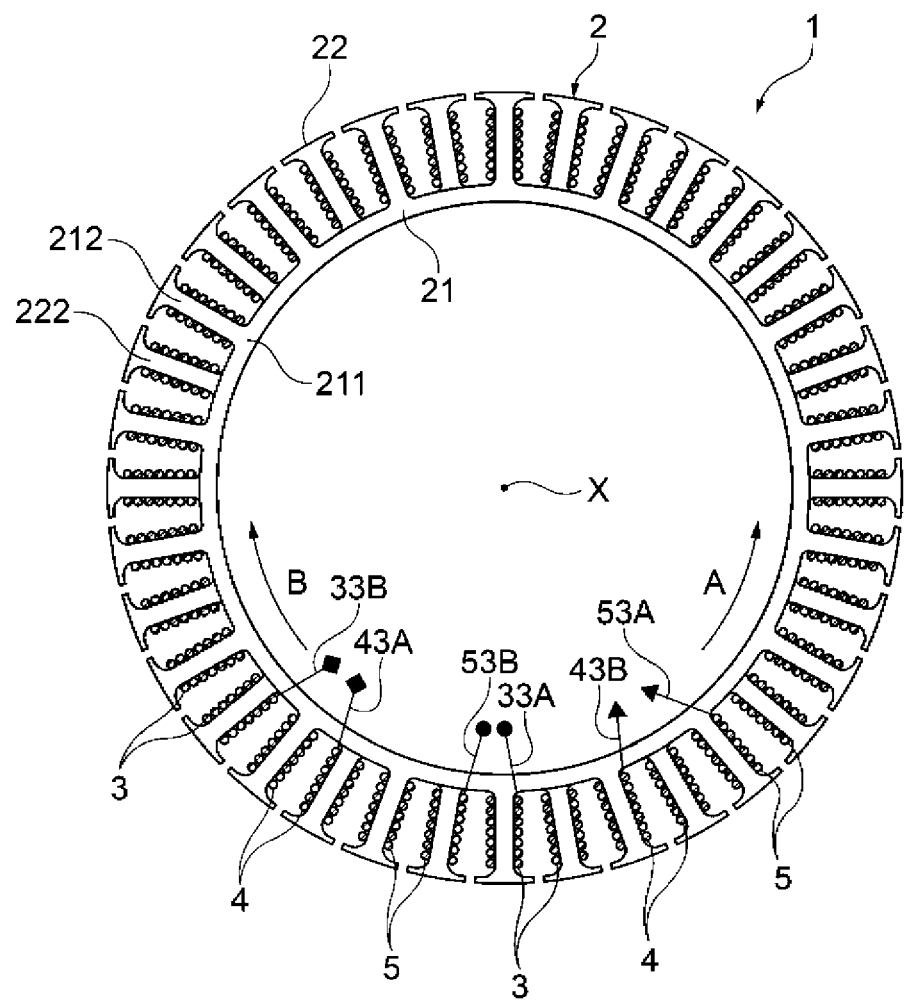
FIG. 1 is a plan view of a motor according to an embodiment being an example of the present invention.
Figure 2:
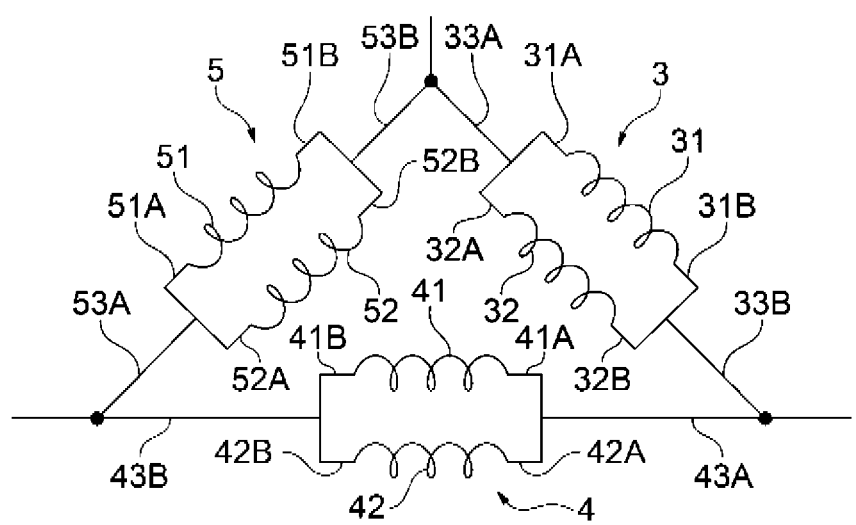
FIG. 2 is a connection diagram of the motor according to the embodiment being an example of the present invention.
Figure 5:
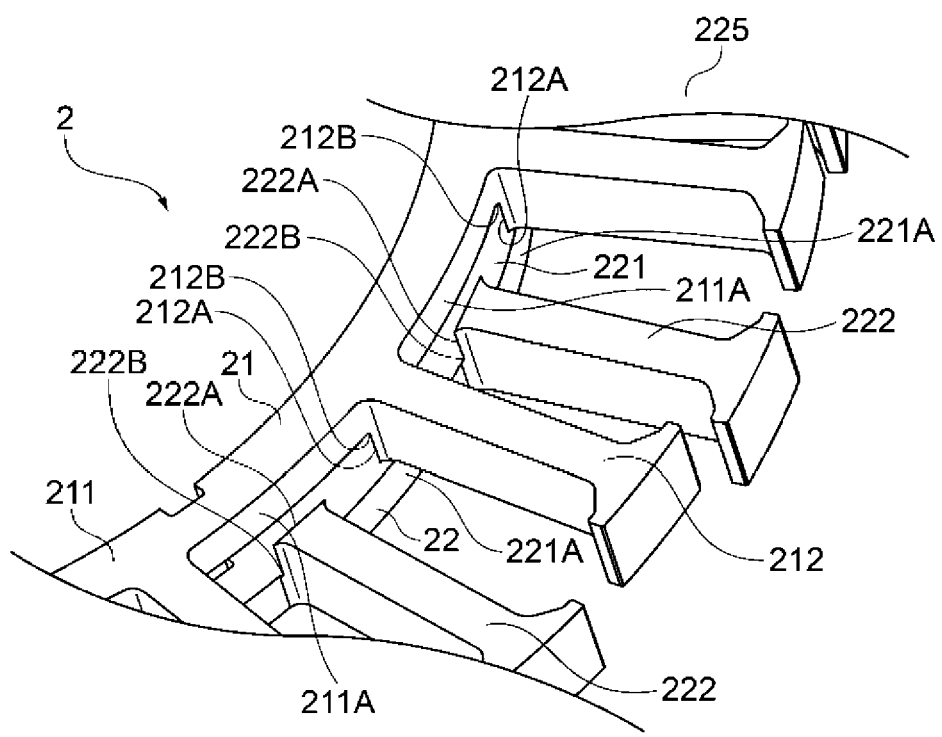
FIG. 5 is an enlarged exploded perspective view of the stator of the motor according to the embodiment being an example of the present invention.
Figure 6:
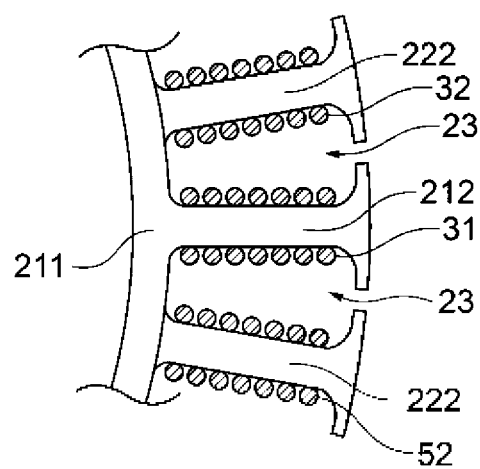
FIG. 6 is an enlarged plan view of the motor according to the embodiment being an example of the present invention.
Figure 7:
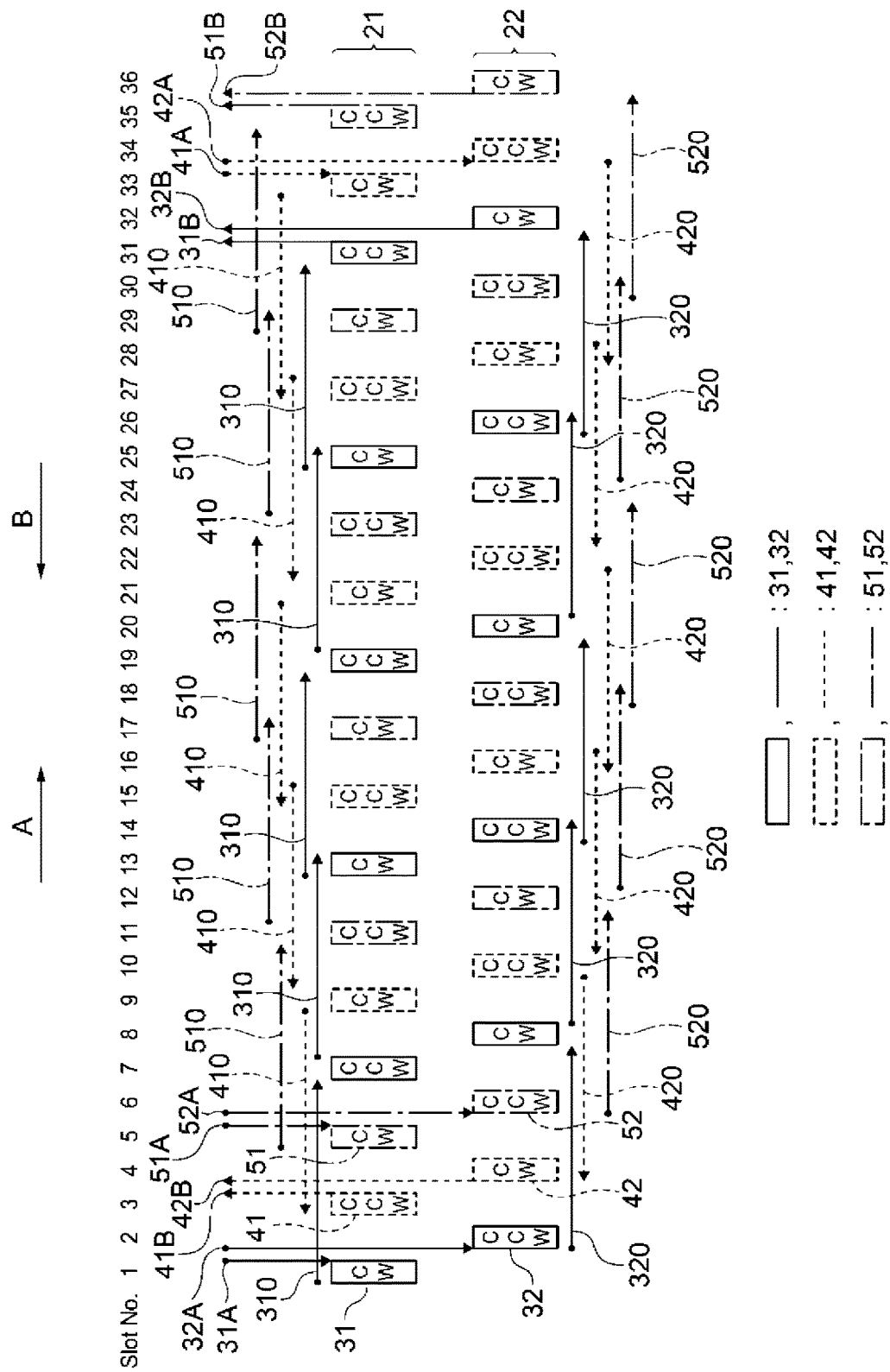
FIG. 7 is a schematic diagram of first to third coil groups of the motor according to the embodiment being an example of the present invention.

Embodiments of the present invention will be described below with reference to the drawings. FIG. 1 is a plan view of a motor 1 according to an embodiment being an example of the present invention, FIG. 2 is a connection diagram of the motor 1, FIG. 3 is an exploded perspective view of a stator 2 of the motor 1, FIG. 4 is a perspective view of the stator 2, FIG. 5 is an enlarged exploded perspective view of the stator 2, FIG. 6 is an enlarged plan view of the motor 1, and FIG. 7 is a schematic diagram of first to third coil groups 3 to 5 of the motor 1.

As illustrated in FIG. 1, the motor 1 according to the present embodiment is a brushless motor including a rotor, the stator 2, the first coil group 3, the second coil group 4, and the third coil group 5. In the motor 1, as illustrated in FIG. 2, the first coil group 3 forming a first phase (U phase), the second coil group 4 forming a second phase (V phase), and the third coil group 5 forming a third phase (W phase) are A-connected. A switch device is provided between a power supply and the motor 1, a DC power supply is connected to two of three vertices of the A connection, the connection is sequentially switched, and thus the motor 1 is rotated.

The rotor includes a permanent magnet and rotates about a predetermined rotation axis X. The number of poles of the rotor may be appropriately set, and may be, for example, 42. In the following description, a direction around the rotation axis X is referred to as a "circumferential direction", and a direction toward or away from the rotation axis X in a plane orthogonal to the rotation axis X is referred to as a "radial direction".

Figure 3:
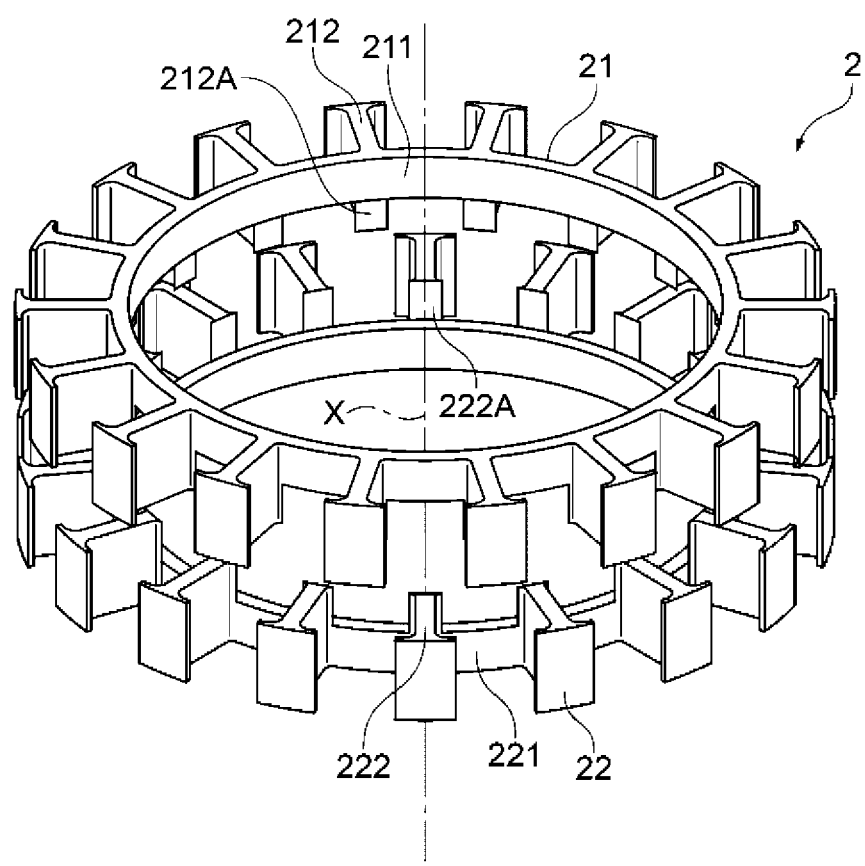
FIG. 3 is an exploded perspective view of a stator of the motor according to the embodiment being an example of the present invention.
Figure 4:
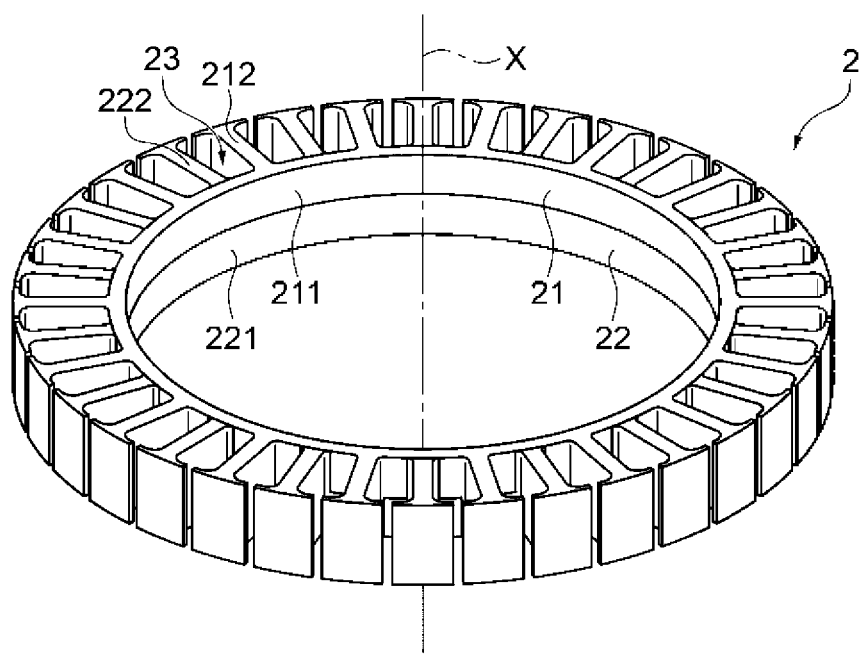
FIG. 4 is a perspective view of the stator of the motor according to the embodiment being an example of the present invention.

As illustrated in FIGS. 3 and 4, the stator 2 includes a first stator 21 and a second stator 22 formed separately from each other. The first stator 21 and the second stator 22 are overlapped with each other in the direction of the rotation axis X of the rotor. The first stator 21 and the second stator 22 may each be formed by stacking a magnetic material having a thin plate shape or may be formed by a single member having a lump shape. In the following, the first stator 21 side is referred to as an upper side and the second stator 22 side is referred to as a lower side, but the upper and lower sides indicate both sides in the direction of the rotation axis X for convenience and do not mean a vertical direction. The first stator 21 includes an annular yoke part (annular part) 211 and a plurality of (18 in the present embodiment) teeth (magnetic pole parts) 212 extending from the yoke part 211 to an outer diameter side (one side) in the radial direction. The second stator 22 includes an annular yoke part (annular part) 221 and a plurality of (18 in the present embodiment) teeth (magnetic pole parts) 222 extending from the yoke part 221 to an outer diameter side (one side) in the radial direction. The first stator 21 and the second stator 22 have a common shape.

The yoke part 211 has approximately half a dimension (thickness) in the direction of the rotation axis X of a tooth 212, the yoke part 221 has approximately half a dimension (thickness) in the direction of the rotation axis X of a tooth 222. In the direction of the rotation axis X, the approximately half of the tooth 212 is supported by the yoke part 211, and the approximately half of the tooth 222 is supported by the yoke part 221. That is, an approximately half of end parts 212A and 222A of the teeth 212 and 222 at an inner side (the other side) in the radial direction is not supported but exposed to the inner side in the radial direction. In this way, the end part 212A has approximately twice the thickness of the yoke part 211, the end part 222A has approximately twice the thickness of the yoke part 221, and stepped parts 212B and 222B are formed between the yoke parts 211 and 221 as illustrated in FIG. 5.

The first stator 21 and the second stator 22 are assembled so that the yoke parts 211 and 221 overlap in the direction of the rotation axis X and the tooth 212 and the tooth 222 are adjacent (staggered) to each other in the circumferential direction (direction around the rotation axis X). As a result, an exposed portion of the end part 222A of the teeth 222 in the second stator 22 opposes a portion 211A between the two magnetic pole parts 212 on an outer peripheral surface of the yoke part 211 in the first stator 21. Similarly, an exposed portion of the end part 212A of the teeth 212 in the first stator 21 opposes a portion 221A between the two magnetic pole parts 222 on an outer peripheral surface of the yoke part 221 in the second stator 22. Furthermore, as illustrated in FIG. 6, an electric wire arrangement part 23 is formed between the tooth 212 and the tooth 222. An electric wire can pass through the electric wire arrangement part 23.

It is assumed that of the plurality of teeth 212 of the first stator 21, any tooth is a first tooth, a tooth adjacent to the first tooth in a first direction (counterclockwise direction in FIG. 1) A of the circumferential direction is a second tooth, and the tooth number increases toward the first direction A. Similarly, it is assumed that of the plurality of teeth 222 of the second stator 22, any tooth is a first tooth, a tooth adjacent to the first tooth in the first direction A of the circumferential direction is a second tooth, and the tooth number increases toward the first direction A. With the first stator 21 and the second stator 22 assembled, it is assumed that the first tooth of the second stator 22 is adjacent to the first tooth of the first stator 21 in the first direction A. Note that "slot No." in FIG. 7 means the tooth number when viewed from the entire stator 2.

The first coil group 3 includes a series coil 31 provided at the first stator 21 and a series coil 32 provided at the second stator 22. Note that a plurality of coils connected in series is referred to as a "series coil." Each of the series coils 31 and 32 is formed by winding a single electric wire around a predetermined tooth to form a coil, then winding the electric wire around another tooth to form a coil, and repeating these processes and is formed of a plurality of coils and crossover wires connecting the coils.

Specifically, as illustrated in FIG. 7, in the series coil 31 provided at the first stator 21, the electric wire is wound around the first tooth 212 to form a coil, is directed toward the first direction A to pass through the upper side of the first stator 21 (side opposite to the second stator 22) to form a crossover wire 310, is wound around the fourth tooth 212 to form a coil, and these processes are repeated. That is, the coil is formed to cause the crossover wire 310 to pass through the upper side of the first stator 21 and to skip two teeth 212. In the series coil 31, the electric wire is finally wound around the $16^{th}$ tooth 212 to form a coil. With the first stator 21 and the second stator 22 assembled, the series coil 31 is provided with a winding start part 31A between the first tooth 212 and the first tooth 222 and a winding end part 31B between the $16^{th}$ tooth 212 and the $16^{th}$ tooth 222, the winding start part 31A being drawn from the upper side, the winding end part 31B being drawn from the upper side.

In the series coil 32 provided at the second stator 22, the electric wire is wound around the first tooth 222 to form a coil, is directed toward the first direction A to pass through the lower side of the second stator 22 (side opposite to the first stator 21) to form a crossover wire 320, is wound around the fourth tooth 222 to form a coil, and these processes are repeated. That is, the coil is formed to cause the crossover wire 320 to pass through the lower side of the second stator 22 and to skip two teeth 222. In the series coil 32, the electric wire is finally wound around the $16^{th}$ tooth 222 to form a coil. In the state where the first stator 21 and the second stator 22 are assembled, the series coil 32 is provided with a winding start part 32A between the first tooth 212 and the first tooth 222 and a winding end part 32B between the $16^{th}$ tooth 212 and the $16^{th}$ tooth 222, the winding start part 32A being drawn from the upper side, the winding end part 32B being drawn from the upper side.

The series coil 31 and the series coil 32 are connected in parallel to each other by connecting the winding start parts 31A and 32A drawn from the upper side and connecting the winding end parts 31B and 32B drawn from the upper side.

In this way, the series coils 31 and 32 constituting the first coil group 3 both have the direction of forming the plurality of coils (direction from the coil on the winding start side toward the coil on the winding end side) as the first direction A of the circumferential direction.

The second coil group 4 includes a series coil 41 provided at the first stator 21 and a series coil 42 provided at the second stator 22. Each of the series coils 41 and 42 is formed by winding a single electric wire around a predetermined tooth to form a coil, then winding the electric wire around another tooth to form a coil, and repeating these processes and is formed of a plurality of coils and crossover wires connecting the coils.

Specifically, in the series coil 41 provided at the first stator 21, the electric wire is wound around the $17^{th}$ tooth 212 to form a coil, is directed toward a second direction (direction opposite to the first direction A of the circumferential direction) B to pass through the upper side of the first stator 21 (side opposite to the second stator 22) to form a crossover wire 410, is wound around the $14^{th}$ tooth 212 to form a coil, and these processes are repeated. That is, the coil is formed to cause the crossover wire 410 to pass through the upper side of the first stator 21 and to skip two teeth 212. In the series coil 41, the electric wire is finally wound around the second tooth 212 to form a coil. With the first stator 21 and the second stator 22 assembled, the series coil 41 is provided with a winding start part 41A between the $17^{th}$ tooth 212 and the $17^{th}$ tooth 222 and a winding end part 41B between the second tooth 212 and the second tooth 222, the winding start part 41A being drawn from the upper side, the winding end part 41B being drawn from the upper side.

In the series coil 42 provided at the second stator 22, the electric wire is wound around the $17^{th}$ tooth 222 to form a coil, is directed toward the second direction B to pass through the lower side of the second stator 22 (side opposite to the first stator 21) to form a crossover wire 420, is wound around the $14^{th}$ tooth 222 to form a coil, and these processes are repeated. That is, the coil is formed to cause the crossover wire 420 to pass through the lower side of the second stator 22 and to skip two teeth 222. In the series coil 42, the electric wire is finally wound around the second tooth 222 to form a coil. With the first stator 21 and the second stator 22 assembled, the series coil 42 is provided with a winding start part 42A between the $17^{th}$ tooth 212 and the $17^{th}$ tooth 222 and a winding end part 42B between the second tooth 212 and the second tooth 222, the winding start part 42A being drawn from the upper side, the winding end part 42B being drawn from the upper side.

The series coil 41 and the series coil 42 are connected in parallel to each other by connecting the winding start parts 41A and 42A drawn from the upper side and connecting the winding end parts 41B and 42B drawn from the upper side. In this way, the series coils 41 and 42 constituting the second coil group 4 both have the direction of forming the plurality of coils as the second direction B of the circumferential direction.

The third coil group 5 includes a series coil 51 provided at the first stator 21 and a series coil 52 provided at the second stator 22. Each of the series coils 51 and 52 is formed by winding a single electric wire around a predetermined tooth to form a coil, then winding the electric wire around another tooth to form a coil, and repeating these processes and is formed of a plurality of coils and crossover wires connecting the coils.

Specifically, in the series coil 51 provided at the first stator 21, the electric wire is wound around the third tooth 212 to form a coil, is directed toward the first direction A to pass through the upper side of the first stator 21 (side opposite to the second stator 22) to form a crossover wire 510, is wound around the sixth tooth 212 to form a coil, and these processes are repeated. That is, the coil is formed to cause the crossover wire 510 to pass through the upper side of the first stator 21 and to skip two teeth 212. In the series coil 51, the electric wire is finally wound around the 18$^{th}$ tooth 212 to form a coil. With the first stator 21 and the second stator 22 assembled, the series coil 51 is provided with a winding start part 51A between the third tooth 212 and the third tooth 222 and a winding end part 51B between the 18$^{th}$ tooth 212 and the 18$^{th}$ tooth 222, the winding start part 51A being drawn from the upper side, the winding end part 51B being drawn from the upper side.

In the series coil 52 provided at the second stator 22, the electric wire is wound around the third tooth 222 to form a coil, is directed toward the first direction A to pass through the lower side of the second stator 22 (side opposite to the first stator 21) to form a crossover wire 520, is wound around the sixth tooth 222 to form a coil, and these processes are repeated. That is, the coil is formed to cause the crossover wire 520 to pass through the lower side of the second stator 22 and to skip two teeth 222. In the series coil 52, the electric wire is finally wound around the 18$^{th}$ tooth 222 to form a coil. With the first stator 21 and the second stator 22 assembled, the series coil 52 is provided with a winding start part 52A between the third tooth 212 and the third tooth 222 and a winding end part 52B between the 18$^{th}$ tooth 212 and the 18$^{th}$ tooth 222, the winding start part 52A being drawn from the upper side, the winding end part 52B being drawn from the upper side.

The series coil 51 and the series coil 52 are connected in parallel to each other by connecting the winding start parts 51A and 52A drawn from the upper side and connecting the winding end parts 51B and 52B drawn from the upper side. In this way, the series coils 51 and 52 constituting the third coil group 5 both have the direction of forming the plurality of coils as the first direction A of the circumferential direction.

When forming each coil in the series coil as described above, the coil is formed by winding an electric wire spirally around each tooth from the inner side to the outer side (or from the outer side to the inner side) in the radial direction. At this time, depending on the number of turns, for example, a first-layer coil may be formed from the inner side to the outer side in the radial direction, a second-layer coil may be formed at the outer side of the first layer from the outer side to the inner side in the radial direction, and any number of layers is used. When the coil is formed in a plurality of layers, an inner layer includes a winding start side, and an outer layer includes a winding end side, and it can be determined that of two coils connected by a crossover wire, a coil having a crossover wire connected to the outer layer is a coil at the winding start side and that a coil having a crossover wire connected to the inner layer is a coil at the winding end side.

The coil provided at each tooth has a spiral orientation. For example, winding that progresses clockwise from the winding start side to the winding end side when viewed from the inner side in the radial direction is assumed as winding in a cw direction, and winding that progresses counterclockwise from the winding start side to the winding end side when viewed from the inner side in the radial direction is assumed as winding in a ccw direction. In the series coils 31, 41, and 51 provided at the first stator among the first to third coil groups 3 to 5, an initial coil is wound in the cw direction from the winding start side, a next coil is wound in the ccw direction, and the winding in the cw direction and the winding in the ccw direction are alternately performed to form a coil. On the other hand, in the series coils 32, 42, and 52 provided at the second stator among the first to third coil groups 3 to 5, an initial coil is wound in the ccw direction from the winding start side, a next coil is wound in the cw direction, and the winding in the cw direction and the winding in the ccw direction are alternately performed to form a coil.

Furthermore, when a certain coil is wound from the inner side to the outer side in the radial direction in each series coil, coils adjacent to each other in the circumferential direction are wound from the outer side to the inner side in the radial direction, and a crossover wire connecting two coils adjacent to each other in the circumferential direction may be alternately disposed at the inner side and the outer side in the radial direction or may always be disposed at an inner diameter side or at outer diameter side of the winding start side.

As described above, by forming the first to third coil groups 3 to 5, in the first stator 21, the coil constituting the series coil 31 of the first coil group 3, the coil constituting the series coil 41 of the second coil group 4, and the coil constituting the series coil 51 of the third coil group 5 align in this order in the first direction A in the circumferential direction. Similarly, in the second stator 22, the coil constituting the series coil 32 of the first coil group 3, the coil constituting the series coil 42 of the second coil group 4, and the coil constituting the series coil 52 of the third coil group 5 align in this order in the first direction A in the circumferential direction.

The coil (coil constituting the series coil 31) provided at the first stator 21 and constituting the first coil group 3 and the coil (coil constituting the series coil 32) provided at the second stator 22 and constituting the first coil group 3 are adjacent to each other in the circumferential direction. The coil (coil constituting the series coil 41) provided at the first stator 21 and constituting the second coil group 4 and the coil (coil constituting the series coil 42) provided at the second stator 22 and constituting the second coil group 4 are adjacent to each other in the circumferential direction. The coil (coil constituting the series coil 51) provided at the first stator 21 and constituting the third coil group 5 and the coil (coil constituting the series coil 52) provided at the second stator 22 and constituting the third coil group 5 are adjacent to each other in the circumferential direction.

The first to third coil groups 3 to 5 are connected as follows. The winding end parts 31B and 32B of the series coils 31 and 32 in the first coil group 3 and the winding start parts 41A and 42A of the series coils 41 and 42 in the second coil group 4 are connected. At this time, the winding ends 31B and 32B are both provided between the 16$^{th}$ tooth 212 and the 16$^{th}$ tooth 222, and the winding start parts 41A and 42A are both provided between the 17$^{th}$ tooth 212 and the 17$^{th}$ tooth 222, and thus the winding end parts 31B and 32B and the winding start parts 41A and 42A are adjacent to each other in the circumferential direction. Specifically, the winding end parts 31B and 32B and the winding start parts 41A and 42A are disposed aligning in the circumferential direction with a total of two upper and lower teeth interposed between the winding end parts 31B and 32B and the winding start parts 41A and 42A.

The winding end parts 51B and 52B of the series coils 51 and 52 in the third coil group 5 and the winding start parts 31A and 32A of the series coils 31 and 32 in the first coil group 3 are connected. At this time, the winding end parts 51B and 52B are both provided between the 18$^{th}$ tooth 212 and the 18$^{th}$ tooth 222, the winding start parts 31A and 32A are both provided between the first tooth 212 and the first tooth 222, and thus the winding end parts 51B and 52B and the winding start parts 31A and 32A are adjacent to each other in the circumferential direction. Specifically, the winding end parts 51B and 52B and the winding start parts 31A and 32A are disposed aligning in the circumferential direction with a total of two upper and lower teeth interposed between the winding end parts 51B and 52B and the winding start parts 31A and 32A.

The winding end parts 41B and 42B of the series coils 41, 42 in the second coil group 4 and the winding start parts 51A and 52A of the series coils 51 and 52 in the third coil group 5 are connected. At this time, the winding end parts 41B and 42B are both provided between the second tooth 212 and the second tooth 222, the winding start parts 51A and 52A are both provided between the third tooth 212 and the third tooth 222, and thus the winding end parts 41B and 42B and the winding start parts 51A and 52A are adjacent to each other in the circumferential direction. Specifically, the winding end parts 41B and 42B and the winding start parts 51A and 52A are disposed aligning in the circumferential direction with a total of two upper and lower teeth interposed between the winding end parts 41B and 42B and the winding start parts 51A and 52A.

The winding start parts 31A and 32A in the first coil group 3 are drawn to the upper side of the stator 2 as described above and have a lead wire 33A. The winding end parts 31B and 32B in the first coil group 3 are drawn to the upper side of the stator 2 as described above and have a lead wire 33B. The winding start parts 41A and 42A in the second coil group 4 are drawn to the upper side of the stator 2 as described above and have a lead wire 43A. The winding end parts 41B and 42B in the second coil group 4 are drawn to the upper side of the stator 2 as described above and have a lead wire 43B. The winding start parts 51A and 52A in the third coil group 5 are drawn to the upper side of the stator 2 as described above and have a lead wire 53A. The winding end parts 51B and 52B in the third coil group 5 are drawn to the upper side of the stator 2 as described above and have a lead wire 53B.

The lead wires 33A, 33B, 43A, 43B, 53A, and 53B extend along the radial direction by being drawn to the inner side in the radial direction and are disposed so that a plurality of the lead wires 33A, 33B, 43A, 43B, 53A, and 53B align in the circumferential direction. Furthermore, the lead wire 33B and the lead wire 43A are connected, the lead wire 53B and the lead wire 33A are connected, and the lead wire 43B and the lead wire 53A are connected. Note that the first coil group 3 includes two series coils 31 and 32 and the two series coils 31 and 32 include the winding start parts 31A and 32A, respectively, but one lead wire 33A may be provided for the two winding start parts 31A and 32A or the lead wires provided at the winding start parts 31A and 32A may be collectively referred to as the lead wire 33A. The same applies to the lead wire 33B on the winding end side, and the same also applies to the lead wires 43A and 43B in the second coil group 4 and the lead wires 53A and 53B in the third coil group 5. Furthermore, each lead wire may be formed integrally with the coil or may be formed separately.

Figure 8:
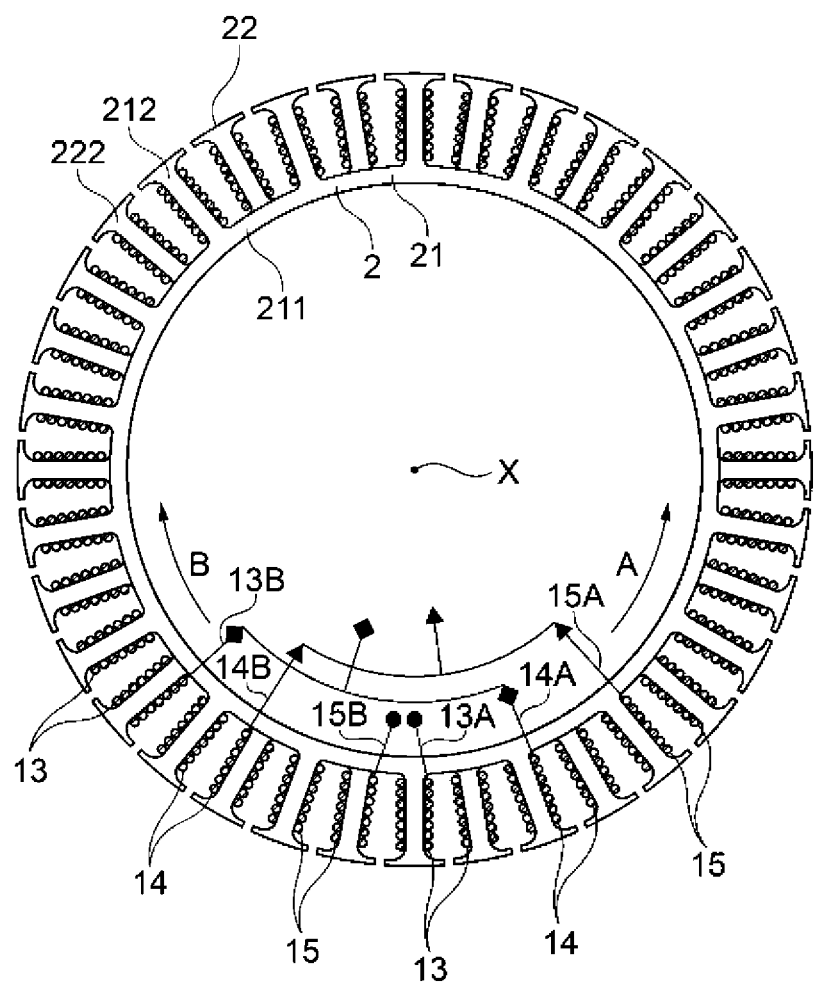
FIG. 8 is a plan view of a motor of another example.

Hereinafter, as another example, a case where in each of series coils of a first coil group 13, a second coil group 14, and a third coil group 15, the directions of forming a plurality of coils are all the first direction A as illustrated in FIG. 8 will be described. In the present embodiment and another example, windings of the first coil group are common, windings of the third coil group are common, and windings of the second coil group are different from each other.

In two upper and lower series coils constituting the second coil group 14, an electric wire is wound around the second teeth 212 and 222 to form a coil and is directed toward the first direction A to form a crossover wire, is wound around the fifth teeth 212 and 222 to form a coil, and this process is repeated. That is, the coil is formed skipping two teeth 222, and a coil formed in the 17$^{th}$ teeth 212 and 222 is the last coil. That is, in the series coil of the second coil group 14, a winding start part is provided between the second tooth 212 and the second tooth 222, and a winding end part is provided between the 17$^{th}$ tooth 212 and the 17$^{th}$ tooth 222.

In the series coil provided at the first stator 21 of the first coil group 13 and the third coil group 15, an initial coil is wound in the cw direction from the winding start side, and in the series coil provided at the first stator 21 of the second coil group 14, an initial coil is wound in the ccw direction from the winding start side. Furthermore, in the series coil provided at the second stator 22 of the first coil group 13 and the third coil group 15, an initial coil is wound in the ccw direction from the winding start side, and in the series coil provided at the second stator 22 of the second coil group 14, an initial coil is wound in the cw direction from the winding start side. Furthermore, in any of the series coils, a coil wound in the cw direction and a coil wound in the ccw direction are alternately aligned as in the present embodiment.

Also in such another example, a winding start part and a winding end part are connected to achieve the same Δ connection as in the present embodiment. That is, a lead wire 13B provided at a winding end part of the first coil group 13 and a lead wire 14A provided at a winding start part of the second coil group 14 are connected. A lead wire 15B provided at a winding end part of the third coil group 15 and a lead wire 13A provided at a winding start part of the first coil group 13 are connected. A lead wire 14B provided at a winding end part of the second coil group 14 and a lead wire 15A provided at a winding start part of the third coil group 15 are connected. At this time, the lead wire 15B of the winding end part of the third coil group 15 and the lead wire 13A of the winding start part of the first coil group 13 are adjacent to each other in the circumferential direction as in the present embodiment. However, the lead wire 13B of the winding end part of the first coil group 13 and the lead wire 14A of the winding start of the second coil group 14 interpose a total of six teeth in the upper and lower stators and are disposed apart from each other as compared to the present embodiment. Similarly, the lead wire 14B of the winding end part of the second coil group 14 and the lead wire 15A of the winding start part of the third coil group interpose a total of six teeth in the upper and lower stators and are disposed apart from each other as compared to the present embodiment.

Accordingly, in the present embodiment, a winding end part and a winding start part to be connected can be disposed adjacent to each other in the circumferential direction, and connecting wires for connecting the winding end part and the winding start part can be shortened, as compared to another example. Accordingly, the connection between the winding end part and the winding start part becomes easy, and it is difficult for the connecting wires to intersect each other or for the connecting wires to interfere with an opponent stator.

According to the present embodiment, the direction of forming the series coil of the second coil group 4 (second direction B) is opposite to the direction of forming the series coil of the first coil group 3 and the third coil group 5 (first direction A), allowing a winding end part and a winding start part to be connected in the series coil of each coil group to be made adjacent to each other in the circumferential direction and the workability of the connection to be improved. Accordingly, assembly of the motor 1 can be facilitated.

Furthermore, since the first to third coil groups 3 to 5 each have a series coil provided at the first stator 21 and the second stator 22, the series coil is not formed across the first stator 21 and the second stator 22 and can be formed by winding an electric wire independently in each of the first stator 21 and the second stator 22. Moreover, in each of the first to third coil groups 3 to 5, the series coil provided at the first stator 21 and the series coil provided at the second stator 22 are connected in parallel, allowing the same characteristics to be obtained when a coil is formed across the first stator 21 and the second stator 22.

Furthermore, in the series coils 31, 41, and 51 provided at the first stator 21, a crossover wire is disposed at the side opposite to the second stator 22, and in the series coils 32, 42, and 52 provided at the second stator 22, a crossover wire is disposed at the side opposite to the first stator 21, allowing the crossover wire and an opponent stator to be less likely to interfere with each other and assembly of the motor 1 to be facilitated.

Furthermore, the winding start part and the winding end part of the first to third coil groups 3 to 5 have lead wires drawn to the inner side in the radial direction, and the lead wires are disposed aligning in the circumferential direction, allowing the lead wires to be easily connected to each other and assembly of the motor 1 to be facilitated.

Furthermore, in the present embodiment, a winding end part and a winding start part to be connected can be disposed adjacent to each other in the circumferential direction, and connecting wires for connecting the winding end part and the winding start part can be shortened, as compared to another example. Accordingly, the connecting wire is shortened, allowing a resistance value of the connecting wire to be reduced and a resistance value of the entire motor to be reduced.

As described above, the motor according to the present invention is described with reference to the preferred embodiments, but the motor of the present invention is not limited to the configurations of the embodiments described above. For example, in the above embodiment, a winding start part and a winding end part of the first to third coil groups 3 to 5 have a lead wire drawn to the inner side in the radial direction; however, the lead wire may be drawn to the outer side in the radial direction or may be drawn along the direction of the rotation axis X. The extension direction of the lead wire is appropriately set in relation to other members constituting the motor.

Furthermore, in the above embodiment, the first to third coil groups 3 to 5 are Δ-connected, but may also be Y-connected. Furthermore, it is sufficient if the motor includes at least the first to third coil groups, or the motor may have four or more phases, and appropriate connection is preferably employed depending on the number of phases.

Furthermore, in the above embodiment, the first stator 21 and the second stator 22 have each 18 teeth and the motor has a total of 36 teeth as a whole; however, any number of the teeth in the stator is preferably set.

Furthermore, in the above embodiment, an example of the shape of the first stator 21 and the second stator 22 is illustrated; however, the first stator and the second stator may have a shape to be described in the following modifications 1 to 4.

Stator of Modification 1

Figure 9:
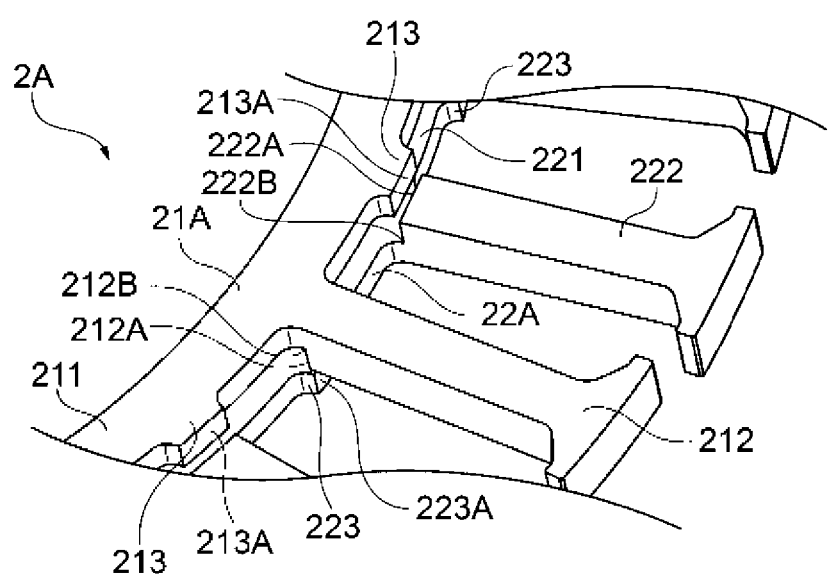
FIG. 9 is an enlarged perspective view of a stator of a motor according to modification 1 being an example of the present invention.

A stator 2A of modification 1 illustrated in FIG. 9 includes a first stator 21A and a second stator 22A. The first stator 21A and the second stator 22A each include not only a plurality of protruding parts 213 and 223 extending from the yoke parts 211 and 221 to the outer side in the radial direction but also the yoke parts (annular part) 211 and 221 as in the above embodiment and the plurality of teeth 212 and 222 as in the above embodiment. In the first stator 21A, the plurality of protruding parts 213 is disposed between two teeth 212, and in the second stator 22A, the plurality of protruding parts 223 is disposed between the two teeth 222.

The first stator 21A and the second stator 22A are assembled so that positions in the circumferential direction of the protruding parts 213 of the first stator 21A and the teeth 222 of the second stator 22A substantially coincide with each other. As a result, an end part (end surface) 213A of the protruding part 213 at the outer side in the radial direction and an exposed portion of an end part 222A of the teeth 222 at the inner side in the radial direction oppose each other. At this time, positions in the circumferential direction of the protruding part 223 of the second stator 22A and the teeth 212 of the first stator 21A substantially coincide with each other. As a result, an end part (end surface) 223A of the protruding part 223 at the outer side in the radial direction and an exposed portion of an end part 212A of the teeth 212 at the inner side in the radial direction oppose each other. Surfaces of the teeth and the protruding parts opposing each other may abut or have a slight gap.

Note that, in the above embodiment and modification 1, a part of the end parts 212A and 222A of the teeth 212 and 222 at the inner side in the radial direction is exposed to form a stepped part; however, the stepped part may not be formed and, for example, a teeth and a yoke part may be smoothly connected.

Stator of Modification 2

Figure 10:
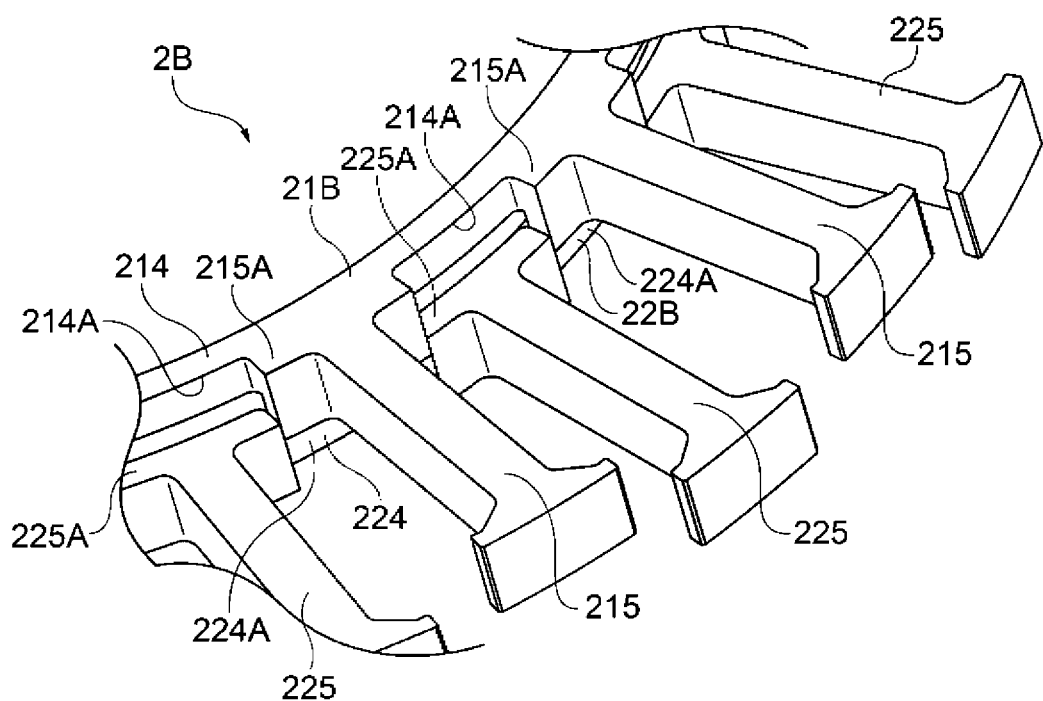
FIG. 10 is an enlarged perspective view of a stator of a motor according to modification 2 being an example of the present invention.

A stator 2B of modification 2 illustrated in FIG. 10 includes a first stator 21B and a second stator 22B. The first stator 21B and the second stator 22B each include an annular yoke part (annular part) 214 and 224, and a plurality of teeth 215 and 225 extending from the yoke part 214 and 224 to an outer side (one side) in the radial direction. A recessed part 214A is formed between two teeth 215 on an outer peripheral side of the yoke part 214 of the first stator 21B, and a recessed part 224A is formed between two teeth 225 on an outer peripheral side of the yoke part 224 of the second stator 22B. In modification 2, in the circumferential direction, it is assumed that the teeth 215 are formed in an entire range of the first stator 21B formed with no recessed part 214A, and the teeth 225 are formed in an entire range of the second stator 22B formed with no recessed part 224A. That is, a protruding part 215A located between two recessed parts 214A is also included in the teeth 215, a protruding part 225A located between two recessed parts 224A is also included in the teeth 225, and the teeth 215 and 225 are formed in a T shape when viewed from the direction of the rotation axis X.

The circumferential dimension of the protruding part 215A in the first stator 21B is set to be equivalent to the circumferential dimension of the recessed part 224A in the second stator 22B, and the height (radial dimension) of the protruding part 215A is set to be equivalent to the depth (radial dimension) of the recessed part 224A. The circumferential dimension of the protruding part 225A in the second stator 22B is set to be equivalent to the circumferential dimension of the recessed part 214A in the first stator 21B, and the height (radial dimension) of the protruding part 225A is set to be equivalent to the depth (radial dimension) of the recessed part 214A.

The first stator 21B and the second stator 22B are assembled so that positions in the circumferential direction of the recessed part 214A of the first stator 21B and the protruding part 225A of the second stator 22B substantially coincide with each other and positions in the circumferential direction of the recessed part 224A of the second stator 22B and the protruding part 215A of the first stator 21B substantially coincide with each other. As a result, the protruding part 225A (end part at the inner side in the radial direction) of the teeth 225 in the second stator 22B is fitted into each of the plurality of recessed parts 214A (part between two teeth 215) in the first stator 21B. Furthermore, the protruding part 215A (end part at the inner side in the radial direction) of the teeth 215 in the first stator 21B is fitted into each of the plurality of recessed parts 224A (part between two teeth 225) in the second stator 22B.

According to modification 2 described above, the teeth 215 and 225 have the protruding parts 215A and 225A at the inner side in the radial direction (the yoke parts 214 and 224 side), respectively, allowing a winding failure of an electric wire at the boundary between the teeth 215 and 225 and the yoke parts 214 and 224 to be suppressed even when the yoke parts 214 and 224 are thinned due to the division of the stator 2B.

Stator of Modification 3

Figure 11:
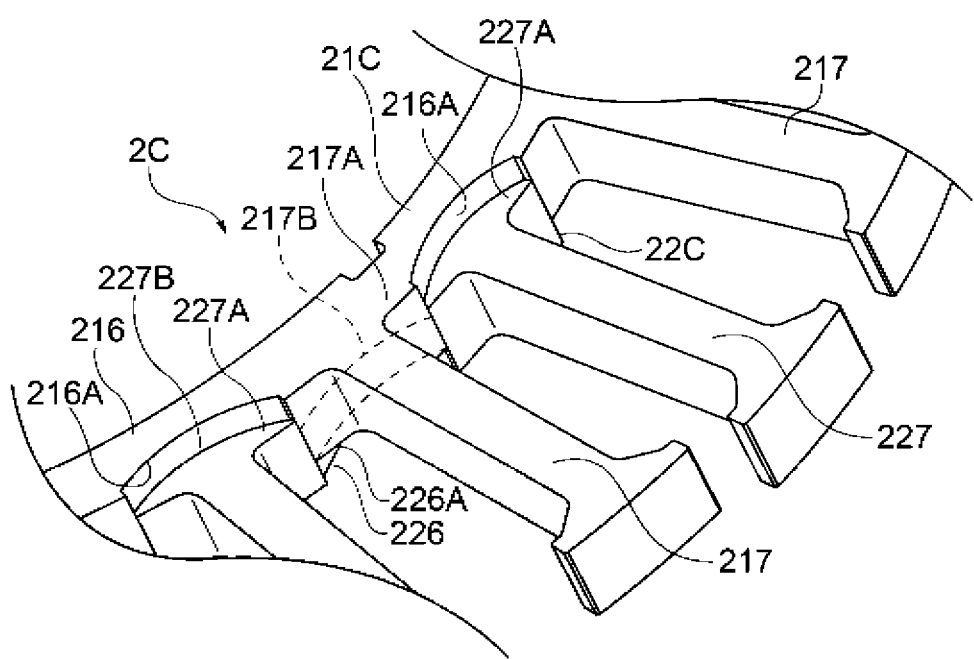
FIG. 11 is an enlarged perspective view of a stator of a motor according to modification 3 being an example of the present invention.

A stator 2C of modification 3 illustrated in FIG. 11 includes a first stator 21C and a second stator 22C. The first stator 21C and the second stator 22C each include an annular yoke part (annular part) 216 and 226, and a plurality of teeth 217 and 227 extending from the yoke part 216 and 226 to an outer side (one side) in the radial direction. The stator 2C of modification 3 is different from the stator 2B of modification 2 in the shapes of recessed parts 216A and 226A formed in the yoke parts 216 and 226 and the shapes of protruding parts 217A and 227A of the teeth 217 and 227.

Bottom surfaces of the recessed parts 214A and 224A in modification 2 extend along the circumferential direction, and depths of the recessed parts 214A and 224A are substantially constant. On the other hand, the recessed parts 216A and 226A in modification 3 become deeper as the recessed parts 216A and 226A move away from the teeth 217 and 227, and each have a shape recessed toward the inner side in the radial direction from a circle centered on the rotation axis X when viewed from the direction of the rotation axis X.

The protruding parts 215A and 225A in modification 2 each include an end surface at the inner side in the circumferential direction extending along the circumferential direction, and each have a substantially constant radial dimension. On the other hand, the protruding parts 217A and 227A in modification 3 each have a larger radial dimension as the protruding parts 217A and 227A move away from the recessed parts 216A and 226A. That is, the protruding part 217A and 227A as end parts of the teeth 217 and 227 at the inner side in the radial direction respectively include convex curve portions 217B and 227B toward the inner side in the radial direction when viewed from the direction of the rotation axis X. That is, the recessed parts 216A and 226A and the protruding parts 217A and 227A are fitted into each other.

The first stator 21C and the second stator 22C are assembled so that positions in the circumferential direction of the recessed part 216A of the first stator 21C and the protruding part 227A of the second stator 22C substantially coincide with each other and positions in the circumferential direction of the recessed part 226A of the second stator 22C and the protruding part 217A of the first stator 21C substantially coincide with each other. As a result, the protruding part 227A (end part at the inner side in the radial direction) of the teeth 227 in the second stator 22C is fitted into each of the plurality of recessed parts 216A (part between two teeth 217) in the first stator 21C. Furthermore, the protruding part 217A (end part at the inner side in the radial direction) of the teeth 217 in the first stator 21C is fitted into each of the plurality of recessed parts 226A (part between two teeth 227) in the second stator 22C.

According to modification 3 described above, similar to modification 2, the teeth 217 and 227 have the protruding parts 217A and 227A, respectively, allowing a winding failure of an electric wire at the boundary between the teeth 217 and 227 and the yoke parts 216 and 226 to be suppressed even when the yoke parts 216 and 226 are thinned due to the division of the stator 2C.

In the above embodiments and modifications 1 to 3, the teeth as the magnetic pole part may extend from the yoke part as an annular part to the outer side in the radial direction, but the magnetic pole part may extend from the annular part to the inner side in the radial direction. At this time, a boundary part is formed between a part of the magnetic pole part at the outer side in the radial direction and a part of the annular part at the inner side in the radial direction, but the structure of the boundary part is preferably the same as structures of the above embodiments and modifications 1 to 3.

In addition, the motor according to the present invention may be appropriately modified by a person skilled in the art according to conventionally known knowledge. Such modifications are of course included in the scope of the present invention as long as these modifications still include the configuration of the present invention.

REFERENCE SIGNS LIST

1 Motor
21 First stator
22 Second stator
211, 221 Yoke part (annular part)
212, 222 Teeth (magnetic pole part)
212A, 222A, 215A, 225A, 217A, 227A End part
214A, 224A, 216A, 226A Recessed part
3 First coil group
4 Second coil group
5 Third coil group
31, 32, 41, 42, 51, 52 Series coil
31A, 32A, 41A, 42A, 51A, 52A Winding start part
31B, 32B, 41B, 42B, 51B, 52B Winding end part
33A, 33B, 43A, 43B, 53A, 53B Lead wire

The invention claimed is:
1. A motor, comprising:
a rotor;
a first stator and a second stator overlapping in a direction of a rotation axis of the rotor;
a first coil group forming a first phase;
a second coil group forming a second phase; and
a third coil group forming a third phase, wherein
the first stator and the second stator each include a coil constituting the first coil group, a coil constituting the second coil group, and a coil constituting the third coil group provided aligning in this order in a circumferential direction around the rotation axis, the first coil group, the second coil group, and the third coil group each include a plurality of coils provided at the first stator and connected in series and a plurality of coils provided at the second stator and connected in series, in the first stator, in the plurality of coils connected in series in the first coil group and the third coil group, a direction of forming the plurality of coils is a first direction of the circumferential direction, and in the first stator, in the plurality of coils connected in series in the second coil group, a direction of forming the plurality of coils is a second direction opposite to the first direction, winding end parts of the plurality of coils connected in series in the first coil group and winding start parts of the plurality of coils connected in series in the second coil group are connected, winding end parts of the plurality of coils connected in series in the third coil group and winding start parts of the plurality of coils connected in series in the first coil group are connected, and winding end parts of the plurality of coils connected in series in the second coil group and winding start parts of the plurality of coils connected in series in the third coil group are connected.

2. The motor according to claim 1, wherein in each of the first coil group, the second coil group, and the third coil group, the plurality of coils provided at the first stator and connected in series and the plurality of coils provided at the second stator are electrically connected in parallel.

3. The motor according to claim 1, wherein
at least two connected to each other of the winding start parts and the winding end parts in the first coil group, the second coil group, and the third coil group include a lead wire drawn in a radial direction and connected to each other, and
a plurality of the lead wires is disposed aligning in the circumferential direction.

4. The motor according to claim 1, wherein
with the first stator and the second stator overlapped in the direction of the rotation axis,
the coil provided at the first stator and constituting the first coil group and the coil provided at the second stator and constituting the first coil group are adjacent to each other in the circumferential direction,
the coil provided at the first stator and constituting the second coil group and the coil provided at the second stator and constituting the second coil group are adjacent to each other in the circumferential direction, and
the coil provided at the first stator and constituting the third coil group and the coil provided at the second stator and constituting the third coil group are adjacent to each other in the circumferential direction.

5. The motor according to claim 1, wherein
the first stator and the second stator each include an annular part, a plurality of magnetic pole parts extending from the annular part to one side in the radial direction, and a plurality of protruding parts extending from the annular part to the one side,
the plurality of protruding parts is disposed between two of the magnetic pole parts in each of the first stator and the second stator, and
end parts of the protruding parts at the one side of the first stator and end parts of the magnetic pole parts at the other side in the radial direction in the second stator oppose each other in the radial direction.

6. The motor according to claim 1, wherein
the first stator and the second stator each include an annular part and a plurality of magnetic pole parts extending from the annular part to one side in the radial direction, and
parts of the annular part between two of the magnetic pole parts of the first stator and end parts of the magnetic pole parts at the other side in the radial direction of the second stator oppose each other in the radial direction.

7. The motor according to claim 5, wherein a stepped part is formed at the end parts of the magnetic pole parts at the other side.

8. The motor according to claim 1, wherein
the first stator and the second stator each include an annular part and a plurality of magnetic pole parts extending from the annular part to one side in the radial direction, and
end parts of the magnetic pole parts at the other side in the radial direction of the second stator are fitted into parts of the annular part between two of the magnetic pole parts of the first stator.

9. The motor according to claim 8, wherein
a recessed part is formed between the two magnetic pole parts at the one side of the annular part, and
the end parts of the magnetic pole parts at the other side of the second stator are fitted into a plurality of the recessed parts of the first stator.

10. The motor according to claim 8, wherein
the end parts of the magnetic pole parts at the other side includes a convex curve portion toward the other side.

11. A motor, comprising:
a rotor;
a first stator and a second stator overlapping in a direction of a rotation axis of the rotor;
a first coil group forming a first phase;
a second coil group forming a second phase; and
a third coil group forming a third phase, wherein
the first stator and the second stator each include a coil constituting the first coil group, a coil constituting the second coil group, and a coil constituting the third coil group provided aligning in this order in a circumferential direction around the rotation axis,
the first coil group, the second coil group, and the third coil group each include a plurality of coils provided at the first stator and connected in series and a plurality of coils provided at the second stator and connected in series,
in the second stator, in the plurality of coils connected in series in the first coil group and the third coil group, a direction of forming the plurality of coils is a first direction of the circumferential direction, and in the second stator, in the plurality of coils connected in series in the second coil group, a direction of forming the plurality of coils is a second direction opposite to the first direction,
winding end parts of the plurality of coils connected in series in the first coil group and winding start parts of the plurality of coils connected in series in the second coil group are connected,
winding end parts of the plurality of coils connected in series in the third coil group and winding start parts of the plurality of coils connected in series in the first coil group are connected, and winding end parts of the plurality of coils connected in series in the second coil group and winding start parts of the plurality of coils connected in series in the third coil group are connected.

12. The motor according to claim 11, wherein in each of the first coil group, the second coil group, and the third coil group, the plurality of coils provided at the first stator and connected in series and the plurality of coils provided at the second stator and connected in series are electrically connected in parallel.

13. The motor according to claim 11, wherein
at least two connected to each other of the winding start parts and the winding end parts in the first coil group, the second coil group, and the third coil group include a lead wire drawn in a radial direction and connected to each other, and
a plurality of the lead wires is disposed aligning in the circumferential direction.

14. The motor according to claim 11, wherein
with the first stator and the second stator overlapped in the direction of the rotation axis,
the coil provided at the first stator and constituting the first coil group and the coil provided at the second stator and constituting the first coil group are adjacent to each other in the circumferential direction,
the coil provided at the first stator and constituting the second coil group and the coil provided at the second stator and constituting the second coil group are adjacent to each other in the circumferential direction, and
the coil provided at the first stator and constituting the third coil group and the coil provided at the second stator and constituting the third coil group are adjacent to each other in the circumferential direction.

15. The motor according to claim 11, wherein
the first stator and the second stator each include an annular part and a plurality of magnetic pole parts extending from the annular part to one side in the radial direction, and
the part between two of the magnetic pole parts of the annular part of the first stator and end parts of the magnetic pole parts at the other side in the radial direction in the second stator oppose each other in the radial direction.

16. The motor according to claim 11, wherein
the first stator and the second stator each include an annular part and a plurality of magnetic pole parts extending from the annular part to one side in the radial direction, and
end parts of the magnetic pole parts at the other side in the radial direction of the second stator are fitted into parts of the annular part between two of the magnetic pole parts of the first stator.

17. The motor according to claim 11, wherein
the motor comprises an area where the winding end part and the winding start part are disposed adjacent to each other in the circumferential direction,
wherein the first stator includes a first part and a second part formed by being divided into two parts in the circumferential direction, and
wherein the area is in the first part.

18. The motor according to claim 11, wherein
the motor comprises an area where the winding end part and the winding start part are disposed adjacent to each other in the circumferential direction,
wherein the second stator includes a first part and a second part formed by being divided into two parts in the circumferential direction, and
wherein the area is in the first part.

19. The motor according to claim 1, wherein
the motor comprises an area where the winding end part and the winding start part are disposed adjacent to each other in the circumferential direction,
wherein the first stator includes a first part and a second part formed by being divided into two parts in the circumferential direction, and
wherein the area is in the first part.

20. The motor according to claim 1, wherein
the motor comprises an area where the winding end part and the winding start part are disposed adjacent to each other in the circumferential direction,
wherein the second stator includes a first part and a second part formed by being divided into two parts in the circumferential direction, and
wherein the area is in the first part.

* * * * *